Patented May 1, 1945

2,375,019

UNITED STATES PATENT OFFICE 2,375,019

STABILIZATION OF SOILS

Abraham B. Miller, Newark, Del., assignor to Hercules Powder Company, Wilmington, Del., a corporation of Delaware No Drawing. Application October 18, 1940, Serial No. 361,726

6 Claims. (Cl. 106—123)

This invention relates to the stabilization of soils, and more particularly to the stabilization of road soils and the like by the addition of lignin or certain ligneous materials.

Soil stabilization is the treatment of soils to correct the natural deficiencies thereof and to render them more suitable for use as road-building materials or the like. For example, in the case of some soils, poor load-bearing qualities may be improved. In the case of other soils which have poor moisture resistance, they may be stabilized to prevent rutting, frost heaving, and other phenomena associated with weakening by water.

It has been proposed to prepare stabilized soils for use in road building by blending soils of various particle sizes and physical and chemical properties. For example, a soil which is hard and resists the abrasive and impact action of traffic may be blended with a soil which may provide for interlocking of the soil grains and thereby effect an increase in shear strength. Clay-like materials might be added to absorb water and maintain stability in dry weather. Silt might also be desired to act as a filler and to provide a capillary bond in the presence of water when the clay becomes weak by losing cohesion in wet weather. While such stabilized soil blends have met with some measure of success, they are highly disadvantageous in that their preparation requires grading and blending of an enormous volume of materials and may often require transporting the different soil ingredients from widely separated localities.

It has also been proposed to stabilize soils through the addition of deliquescent materials, such as calcium chloride, to prevent dusting and to prevent the roads from becoming muddy in wet weather. Also, water-soluble binders, such as sulfite liquor concentrate and distillery wastes, have been proposed. The use of such materials, however, is disadvantageous in that at best they provide only temporary stabilization.

I have now found that low-grade soils may be advantageously stabilized by mixing with them a small quantity of lignin or a substantially water-insoluble ligneous material. The soils may or may not be blended first with aggregates or fines to increase their strength and serviceability, and the lignin or ligneous materials may be used alone or in combination with other agents, such as calcium chloride, alkalies, wood rosin, etc. Soils stabilized according to the method of the invention are readily prepared, requiring a minimum amount of handling and transportation of materials, and are more permanently stabilized than the stabilized soils now in common use. They are suitable for use in constructing dams, levees, embankments, etc.; in packing underground pipe lines, conduits, foundations, and the like; and in surfacing roads, race-tracks, tennis courts, playing fields, etc.

As hereinbefore mentioned, either lignin itself, such as is obtained by treating sulphate or soda waste liquor with an acid, or any substantially water-insoluble material which contains a predominant amount of lignin may be employed for stabilizing soils according to the invention. Among the latter materials may be mentioned by way of example the so-called "hydrolyzed wood" which is prepared by treating wood chips or sawdust with dilute mineral acids at elevated temperatures and pressures, and the so-called "Martin resin," which is a mixture of lignin and resinified cellulose such as that described in U. S. Patent 2,265,181 to Martin.

The said so-called "hydrolyzed wood" is more specifically defined by the method of preparing it, wherein finely-divided wood, such as wood chips or sawdust, is mixed with from about 3 to about 10 parts by weight of a dilute sulfuric acid solution of from about 0.4 per cent to about 5 per cent acid, and the mixture heated in the order of about one-half hour at an elevated temperature and pressure corresponding to from about 100 pounds to about 200 pounds steam pressure.

The said so-called "Martin resin" is the resin produced by heating a highly resinous-ligneous wood, or a ligneous wood and a material selected from the group consisting of natural resin acids and materials containing natural resin acids, with water in amount sufficient to submerge substantially completely the wood under superatmospheric pressure at a temperature within the range of about 240° C. to about 330° C., until the cellular structure of the wood has disappeared; the resin remains as a residue after removal of the water solution. The soils which may be stabilized by the addition of such materials include silt or clay or mixtures thereof, or mixtures of silt and/or clay with sand, cinders, pebbles, or aggregate, or any other material which by mechanical or other treatment can be made suitable for use for the purposes mentioned above.

The addition of the ligneous stabilizing agent to the soil may be carried out in a number of ways, the most convenient of which depends upon the particular type of soil and the conditions under which the mixing is carried out. For example, the soil may first be graded or blended in the customary manner and the lignin or ligneous material intimately mixed therewith in finely divided form prior to use. In stabilizing roads already constructed, the surface layer of the road may be harrowed or plowed and the lignin or ligneous material mixed or dispersed therein by scarifying, blading, or harrowing, after which the road is rolled and the surface compacted. Roads which are subjected to heavy traffic should then be given a wearing course of asphalt or aggregate. Another, although less preferred, method of stabilization comprises sprinkling the soil with a dispersion of the finely divided lignin or ligneous material in water or dilute caustic soda, and then compacting the soil.

The proportion of lignin or ligneous material required to secure the desired stabilization depends primarily upon the nature of the soil, some soils requiring more of the stabilizing agent than others to attain the same degree of stabilization. Ordinarily, however, the use of between about 0.2 and about 10 per cent, preferably between about 0.2 and about 3 per cent, of the lignin or ligneous material based on the weight of the soil will be found to produce good results.

The following table presents data demonstrating the stabilizing effect of lignin and ligneous materials on soil, but is not to be construed as limiting the invention. In each experiment described in the table, the soil was molded into a tensile-type briquette, which, with the exception of the neck portion thereof, was then coated with paraffin. One end of each briquette, including the neck, was then immersed in water and the slaking time, i. e., the time required for disintegration of the briquette, was determined.

the method or ingredients stated by any of the following claims, or the equivalent of such stated method or ingredients, be employed.

What I claim and desire to protect by Letters Patent is:

1. The method of stabilizing soil for use as a construction material with improved resistance to water erosion, which comprises admixing with the soil from about 0.2% to about 10% by weight, based on the soil, of a substantially water-insoluble ligneous material which comprises essentially free lignin.

2. The method of stabilizing soil for use as a construction material with improved resistance to water erosion, which comprises admixing with the soil from about 0.2% to about 10% by weight, based on the soil, of a substantially water-insoluble ligneous material which comprises essentially free lignin, and which is dispersed in a dilute aqueous alkaline solution.

3. The method of stabilizing soil for use as a construction material with improved resistance to water erosion, which comprises admixing with the soil from about 0.2% to about 10% by weight, based on the soil, of a substantially water-insoluble ligneous material which contains a predominant amount of lignin, the ligneous material being prepared by subjecting wood or sawdust to an elevated temperature in the presence of a dilute acidic aqueous solution for a period of time sufficient to at least partially hydrolyze the wood and produce thereby a ligneous material containing a predominant amount of free lignin.

4. The method of stabilizing soil for use as a construction material with improved resistance to water erosion, which comprises admixing with the soil from about 0.2% to about 10% by weight, based on the soil, of a substantially water-in-

*Table*

| Experiment No. | Composition of stabilized soil | | Slaking time | Appearance of water at time of slake |
|---|---|---|---|---|
| | Soil base | Stabilizing agent | | |
| 1 | Chester loam (Public Roads Administration soil class A-4; a silt soil without coarse material and with no appreciable sticky colloidal clay). | None (control) | 17 min | V. sl. cloudy |
| 2 | do | 2% lignin A (a purified material prepared by treating maple wood with steam and dilute acid under pressure). | 32 min | Do. |
| 3 | do | 2% hydrolyzed wood (prepared by digesting maple wood chips with hot 3% sulfuric acid under pressure). | 29 min | Do. |
| 4 | do | 0.5% lignin A dispersed in 26 parts of 0.2% aqueous sodium hydroxide. | 82 min | Do. |
| 5 | Ocala lime rock (40-mesh, 7.3% moisture) | None (control) | 6 sec | Cloudy. |
| 6 | do | 2% lignin B (a washed and purified lignin obtained by treating pulp lignin with carbon dioxide). | 85 sec | Do. |
| 7 | Miss. Proj. W. O. 1227 (a blend of 70% sandy clay and 30% gravel; finer than 10-mesh). | None (control) | 15 min | Clear. |
| 8 | do | Tornesch lignin (prepared by acid hydrolysis of wood; 87% insoluble in sulfuric acid; 10.8% methoxyl). | 73 min | Do. |

The above data indicate that ligneous stabilizing agents greatly improve the erosion resistance of widely different types of soils. The addition of such agents also increases the compressive strength thereof and imparts improved all-around wearing characteristics to constructions formed from such stabilized soils. By varying the proportion of the stabilizing agent as well as the character of the soil itself, a wide variety of soil compositions having pre-determined characteristics may be prepared.

Other modes of applying the principle of the invention may be employed instead of those explained, change being made as regards the methods or compositions herein disclosed, provided soluble ligneous material which contains a predominant amount of lignin, the ligneous material being prepared by subjecting wood or sawdust to an elevated temperature in the presence of a dilute acidic aqueous solution for a period of time sufficient to substantially completely hydrolyze the cellulose of the wood and produce thereby a ligneous material containing a predominant amount of free lignin substantially free of cellulose.

5. The method of stabilizing soil for use as a construction material with improved resistance to water erosion, which comprises admixing with the soil from about 0.2% to about 10% by weight, based on the soil, of a substantially water-insoluble ligneous material which contains a predominant amount of lignin, the ligneous material being prepared by subjecting a cellulosic material which contains a substantial proportion of lignin to an elevated temperature in the presence of a dilute acidic aqueous solution for a period of time sufficient to at least partially hydrolyze the cellulosic material and produce thereby a ligneous material containing a predominant amount of free lignin.

6. The method of stabilizing soil for use as a construction material with improved resistance to water erosion, which comprises admixing with the soil from about 0.2% to about 10% by weight, based on the soil, of a substantially water-insoluble ligneous material which contains a predominant amount of lignin, the ligneous material being prepared by subjecting a cellulosic material which contains a substantial proportion of lignin to an elevated temperature in the presence of a dilute acidic aqueous solution for a period of time sufficient to substantially completely hydrolyze the cellulosic material and produce thereby a ligneous material containing a predominant amount of free lignin substantially free of cellulose.

ABRAHAM B. MILLER.